United States Patent [19]

Rumble

[11] Patent Number: 4,488,695
[45] Date of Patent: Dec. 18, 1984

[54] PIPE HANGER

[75] Inventor: Ray M. Rumble, Canfield, Ohio

[73] Assignee: Michigan Hanger Company, Inc., Hubbard, Ohio

[21] Appl. No.: 381,077

[22] Filed: May 24, 1982

Related U.S. Application Data

[63] Continuation-in-part of Ser. No. 257,599, Apr. 27, 1981, abandoned.

[51] Int. Cl.³ .............................................. E21F 17/02
[52] U.S. Cl. ...................................... 248/62; 248/59; 403/326
[58] Field of Search .................... 248/62, 58, 59, 63, 248/316 A, 297 S; 403/326, 329

[56] References Cited

U.S. PATENT DOCUMENTS

| | | | |
|---|---|---|---|
| 1,642,131 | 9/1927 | Tomkinson | 248/62 |
| 2,110,397 | 3/1938 | Kangas | 403/326 |
| 2,762,592 | 9/1956 | Adams | 248/59 |
| 2,996,274 | 8/1961 | Marik et al. | 248/62 |
| 3,253,310 | 5/1966 | McCarthy | 403/326 |
| 4,247,147 | 1/1981 | Rettkowski | 403/326 |

FOREIGN PATENT DOCUMENTS 0592837 11/1977 Switzerland .......................... 248/62

Primary Examiner—William H. Schultz
Assistant Examiner—Ramon O. Ramirez
Attorney, Agent, or Firm—Harpman & Harpman

[57] ABSTRACT

A pipe hanger arranged to be positioned about a pipe to be suspended, moved to closed position and engaged upon a threaded support rod so as to carry the pipe is disclosed. The hanger takes the form of an elongated band preferably metal, the ends of which are brought into proximity to one another by bending the band into a general oval shape, the ends of the band are formed in configurations registering with the thread pattern of the support rod when engaged thereagainst and a ferrule is moved downwardly over the ends of the band so as to move the same into forceful engagement with the threaded supporting rod. Locking devices on the ferrule engage at least one of the ends of the band and/or the support rod so as to hold the ferrule in a position in which the ends of the band remain in tight non-slipping engagement with the threaded support rod.

3 Claims, 15 Drawing Figures

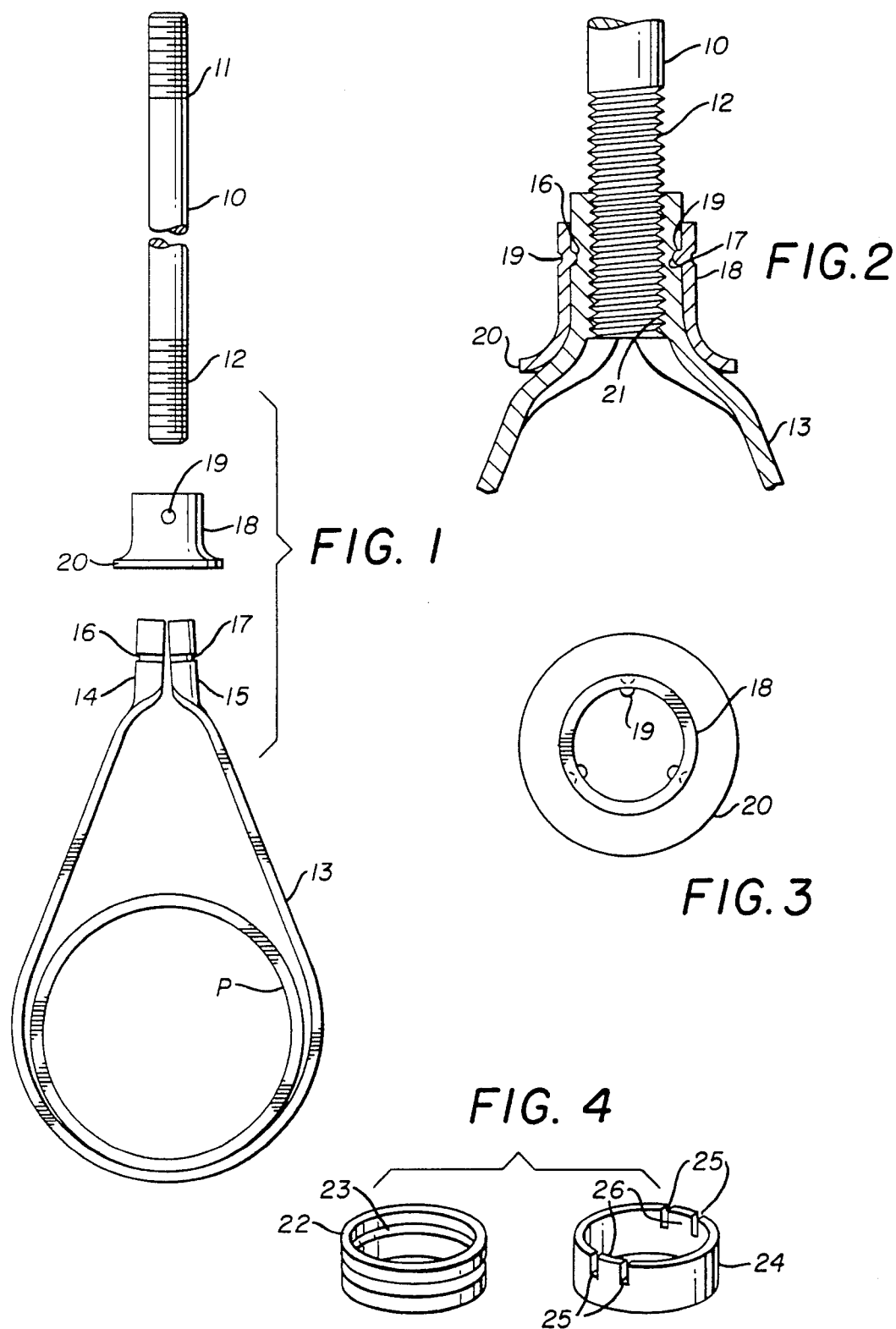

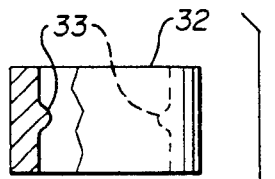
FIG. 5
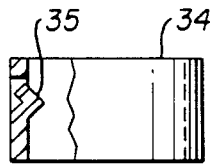
FIG. 6
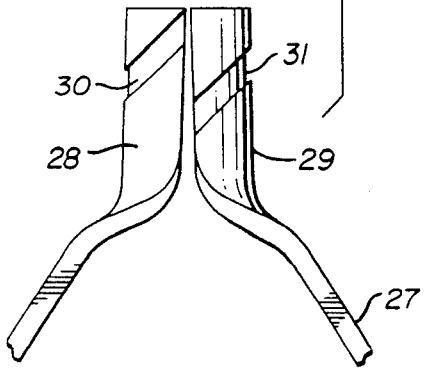
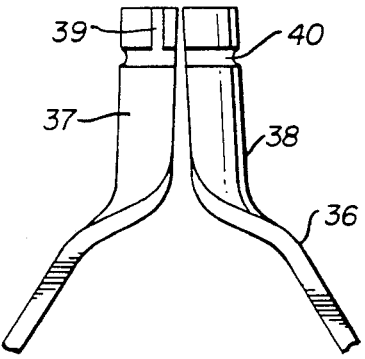
FIG. 7
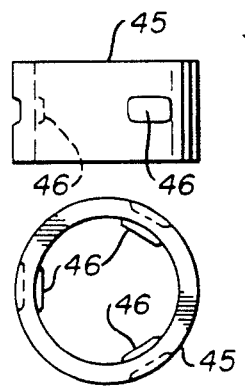
FIG. 8
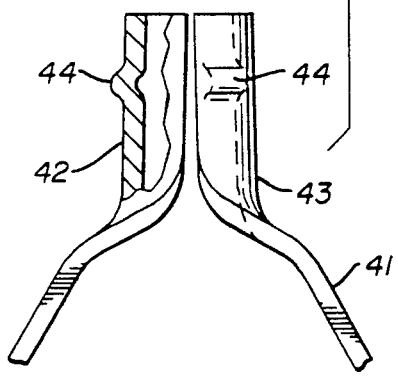
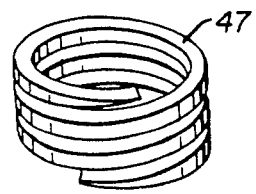
FIG. 9

PIPE HANGER

This is a continuation in part of my patent application Ser. No. 257,599, filed Apr. 27, 1981, now abandoned.

BACKGROUND OF THE INVENTION

1. Technical Field

This invention relates to pipe hangers of the type normally employed to suspend pipes from overhead supports in spaced relation thereto.

2. Description of the Prior Art

Prior structures of this type have generally taken the form of a band arranged in an oval shape with its ends apertured and arranged in superimposed position over a flanged cylindrical coupling which in turn is internally threaded for threaded engagement with a supporting rod and as illustrated in U.S. Pat. No. 2,996,274.

Proposals have been made to alter the usual pipe hanger constructions by clampingly engaging the pipe carrying portion of the pipe hanger on a supporting rod or on a fastener carried by a supporting rod and such constructions may be seen in U.S. Pat. Nos. 476,227, 1,392,810, 1,870,651, 1,924,353, 3,493,206 and 4,306,696.

Swiss Pat. No. 592,837 discloses a strap which can be positioned around a pipe with its ends arranged in oppositely disposed relation on the sides of the threaded rod with a tubular member positioned thereover and held in desired position by a threaded nut engaging the threaded rod.

The present invention and its several modifications differ from the prior art in providing simple structures which are less expensive to manufacture and are easier to install than the prior art devices and particularly in the arrangement of the end configurations of the band in the areas where they engage the threaded rod and the novel configurations in the ferrules which form locking devices which may be quickly and easily installed and/or removed.

SUMMARY OF THE INVENTION

An improved pipe hanger is disclosed which is formed of only two pieces which are engagable with a threaded support rod to form a complete pipe hanger. The pieces comprise an elongated band such as formed of sheet metal or metal strapping with end configurations defining half circular shapes and internally threaded or knurled and arranged to be positioned against the outer opposite sides of a threaded support rod and wedged thereagainst by the application of a ferrule thereover, together with devices formed integrally with the ferrule which automatically engage one of the ends of the band and/or the support rod when the ferrule is moved downwardly over the ends of the band on the threaded rod to lock the assembly in desired pipe supporting position.

DESCRIPTION OF THE DRAWINGS

FIG. 1 is an exploded front elevational view with parts broken away illustrating a pipe hanger and a supporting rod;

FIG. 2 is an enlarged cross section of a portion of an assembly of the pipe hanger seen in FIG. 1 with parts broken away;

FIG. 3 is a top plan view of the ferrule seen in FIGS. 1 and 2;

FIG. 4 is a multiple view of a pair of alternately shaped ferrules that may be used in the pipe hanger seen in FIGS. 1 and 2;

FIG. 5 is an exploded view with parts broken away and parts in cross section illustrating a modified pipe hanger strap and locking ferrule;

FIG. 6 is a side elevation with parts broken away and parts in cross section illustrating a modified ferrule that may be used with the pipe hanger of FIG. 5;

FIG. 7 is a side elevation with parts broken away illustrating a portion of a modified pipe hanger strap;

FIG. 8 is an exploded front elevational view with parts broken away and parts in cross section illustrating a further modification of a pipe hanger strap and a modified ferrule used therewith;

FIG. 9 is a perspective view of an alternate ferrule-like device usable with the pipe hanger straps of the several drawing figures;

DESCRIPTION OF THE PREFERRED EMBODIMENT

Figure 10:
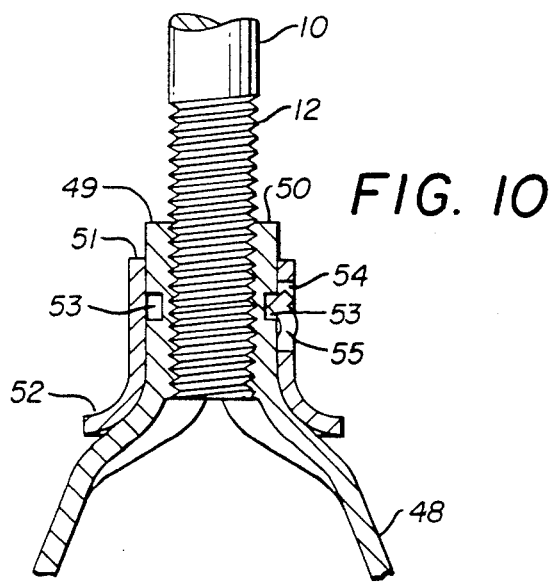
FIG. 10 is a cross sectional side elevation of a portion of a modified pipe hanger strap and modified locking ferrule engaged on a threaded rod.

By referring to FIG. 1 of the drawings, it will be seen that a supporting rod 10 having threaded end sections 11 and 12 respectively thereon is illustrated and those skilled in the art will observe that such supporting rods are common in the pipe hanger art and are usually affixed at their upper ends to an overhead support such as a beam or the like usually by way of a clamp, not shown. An elongated sheet metal strap 13 comprises the portion of the hanger which is positioned around a pipe P to be suspended thereby. The elongated strap 13 has its end portions 14 and 15 respectively shaped in substantially half circular arcuate configurations with representations of thread patterns or the like formed on their inner opposed surfaces and half portions of an annular groove 16 and 17 respectively formed in their outer surfaces. A ferrule 18 having at least one inwardly projecting dimple 19 and a slightly outturned annular lower edge 20 is arranged to be loosely positioned on the threaded rod 10 immediately prior to the engagement of the end portions 14 and 15 of the strap 13 being engaged thereon as shown in FIG. 2 of the drawings.

By referring thereto, it will be seen that the ferrule 18 is then moved downwardly over the half circular end portions 14 and 15 of the strap 13 to a position where the inturned dimples 19 engage in the half circular grooves 16 and 17 and the outturned annular lower edge 20 forcibly engages the oppositely disposed outturned portions of the strap 13, all as best illustrated in FIG. 2 of the drawings.

In FIG. 2 of the drawings, the thread pattern formed on the inner half circular arcuate end portions 14 and 15 of the strap 13 are indicated by the numeral 21.

In FIG. 3 of the drawings, a top plan view of the ferrule 18 may be seen with the inwardly extending dimples 19 arranged in circumferentially spaced relation to one another so as to insure the registration of at least one of the inturned dimples 18 engagement in each of the halve circular annular grooves 16 and 17 as hereinbefore described.

It will occur to those skilled in the art that alternate locking ferrules may be used with the arrangement illustrated in FIGS. 1 and 2 of the drawings and heretofore described and by referring to FIG. 4 of the drawings, two such alternate ferrules may be seen. The ferrule in the left portion of FIG. 4 is a cylindrical member 22 with a continuous annular rib 23 on its inner surface. The material of which the ferrule 22 is made is characterized by its resiliency and the ability of the ferrule to be moved downwardly into position over the oppositely disposed half-circular arcuate end portions 14 and 15 of the strap 13 to a point where the annular rib 23 will snap into the half circular annular grooves 16 and 17. In so doing the end portions 14 and 15 are urged toward one another and held in that relation by the snap in engagement of the rib 23. For removal of the ferrule from the assembly which might at some time be necessary, the ferrule 18 as seen in FIGS. 1 and 2 of the drawings and the ferrule 22 of FIG. 4 can be forcefully disengaged by applying upward motion to the lower annular edges thereof so as to free the registering configurations from the half circular annular grooves 16 and 17.

In the right half of FIG. 4 of the drawings, a further modification of a ferrule usable with the pipe hangers of FIGS. 1 and 2 may be seen and by referring thereto it will be seen that a cylindrical ferrule 24 has a pair of spaced cutaway slots 25 on the opposite sides thereof extending approximately one-third of the overall height of the ferrule 24. The areas between each of the pairs of slots 25 form distortable tabs 26 which are distorted as by peening the same inwardly toward one another when the ferrule 24 is engaged over the end portions 14 and 15 of the strap 13 with the upper inturned corners of the tabs 26 which results from their distortion engaging the half circular grooves 16 and 17 and thus locking the ferrule in position.

By referring now to FIGS. 5 and 6 of the drawings, a further modification of the pipe hanger may be seen and in FIG. 5 the oval shaped strap which surrounds and directly supports the pipe is indicated by the numeral 27 and its end portions 28 and 29 are formed in substantially half-circular arcuate configurations, the inner surfaces of which are either threaded or knurled or otherwise arranged to engage the lower threaded portion 12 of the support rod 10 as heretofore described when moved tightly thereagainst. The outer surfaces of the end portions 28 and 29 are provided with spiral grooves 30 and 31 and a ferrule 32 having a pair of oppositely disposed inturned projections 33 arranged to be positioned over the end portions 28 and 29 when they are engaged on a threaded rod such as indicated at 10 in FIGS. 1 and 2 of the drawings and the ferrule 32 then partially rotated so as to cause the projections 33 to travel downwardly on the spiral grooves 30 and 31 and thus forcefully move the end portions 28 and 29 toward one another to a point where at least one of the projections 33 engages the area between the vertical edges of the end portions 28 and 29 and locks the assembly in position. In this modification, as in those previously described, the ferrule 32 may be of a sufficient length or height so that its lower annular edge engages the oppositely disposed outturned portions of the strap 27 in a further locking and/or clamping action.

A variation of this arrangement may be seen in FIG. 6 of the drawings wherein a modified ferrule 34 is formed with an inturned resilient tab 35 which, like the projections 33, will register with at least one of the spiral grooves 30 and 31 in the end portions 28 and 29 of the strap 27 and upon being rotated will move downwardly so as to urge the same together and move into locking position between the respective halves.

The same modified ferrule 34 as seen in FIG. 6 of the drawings and just described, will function with the arrangement of the end portions of the supporting strap of the pipe hanger as seen in FIG. 7 and by referring thereto it will be seen that the pipe hanger strap is indicated by the numeral 36 with its oppositely disposed arcuate end sections 37 and 38, each provided with half circular grooves 40 and one with a vertical groove 39. When the ferrule of FIG. 6 is moved downwardly on this modification of the pipe hanger strap 36, the resilient inturned tab 35 will register with the vertical groove 39 or the space between the ends 36 and 38 and upon being rotated move into locking position in one of the grooves 40 in the half portions 37 and 38 thus locking the assembly.

Still other modifications of the locking means are possible and by referring to FIG. 8 of the drawings, a pipe hanger strap 41 may be seen with the end portions 42 and 43 thereof provided with circumferentially spaced outwardly extending projections 44. FIG. 8 is an exploded composite view and the uppermost portion thereof illustrates a ferrule 45 which is cylindrical and has circumferentially spaced inturned projections 46 thereabout as may also be seen in the middle view of FIG. 8 which is a top plan view of the ferrule 45. When the ferrule 45 is pushed downwardly over the end portions 42 and 43 it is rotated to permit the inward projections 46 to miss the outward projections 44 and when the projections 46 have moved to a position below the projections 44 it is then partially rotated to lock the assembly securely about the threaded end of the support rod such as indicated at 10 in FIGS. 1 and 2 of the drawings.

By referring to FIG. 9 of the drawings, a still further type of ferrule that is useful with the strap of the several pipe hangers hereinbefore described may be seen to comprise a continuously formed section of cross sectionally square resilient metal rod 47 arranged in registering convolutions with the opposite ends of the spirally shaped rod 47 being tapered. The construction is such that when this resilient spiral ferrule 47 is pushed or rotated down on the end portions of the pipe hanger strap as seen in any of the hereinbefore described figures, it will by reason of its sharp annular edges engage and lock itself in position as it is rotated and hold such position by reason of its inherent resiliency thus holding the pipe hanger assembly, as for example that shown in FIG. 1 of the drawings in secure relation to the support rod and the pipe being supported.

In FIG. 10 of the drawings, a pipe hanger support rod 10 with its lower threaded end 12 is shown supporting a strap 48 which is adapted to hold a pipe as heretofore explained in connection with FIG. 1 of the drawings with the end portions 49 and 50 of the strap 48 arranged in oppositely disposed arcuate configurations, the inner surface of which are threaded or otherwise shaped to engage the threaded portion 12 of the support rod 10. A modified ferrule 51, which is very much like the ferrule 18 in FIGS. 1 and 2 of the drawings, has an enlarged annular lower edge 52 and each of the end portions 49 and 50 have half circular annular grooves 53 formed therein. A cutaway inverted U-shaped slot 54 in at least one side of the ferrule 51 defines a resilient tab 55 which will snap into the half circular grooves 53 in the end portions 49 and 50 when the ferrule 51 is pushed downwardly to a location where its lower edge 52 engages the outturned portions of the strap 48.

Figure 11:
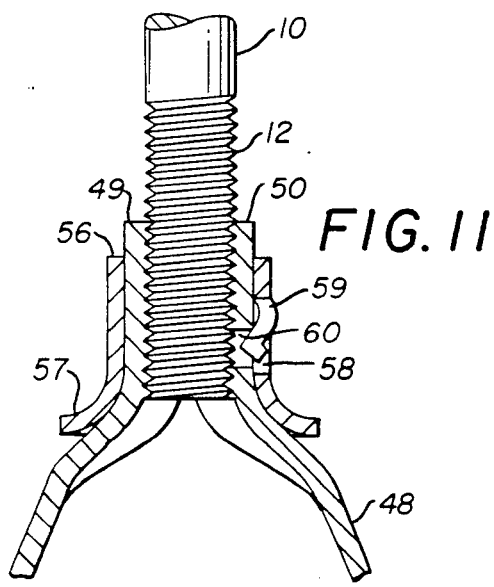
FIG. 11 is a cross sectional side elevation of a further modification of a pipe hanger strap and a ferrule similar to the devices of FIG. 10.

In FIG. 11 this construction is shown reversed with a ferrule 56 having a slightly outturned lower edge 57 engaged on the ends 49 and 50 of the strap 48 and with the U-shaped cutaway section being indicated at 58 so as to form a resilient tab 59 which will register in an opening 60 formed in one of the end portions 49 or 50. A modification of this arrangement may comprise the formation of duplicate spring tabs 59 and duplicate openings 60, as will occur to those skilled in the art.

Figure 12:
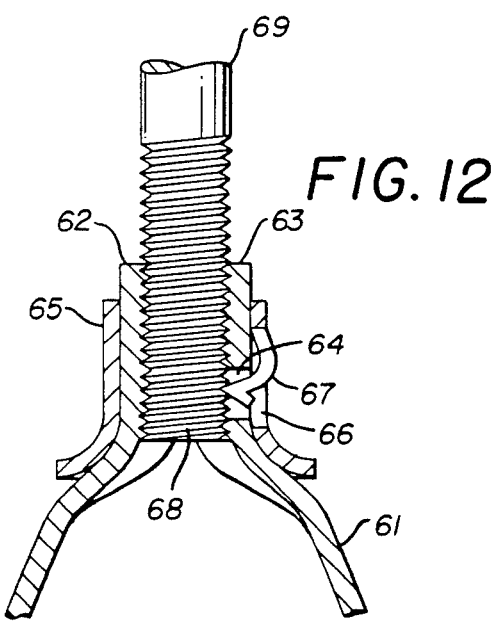
FIG. 12 is a cross sectional side elevation of a still further modification of a pipe hanger strap and a ferrule having a locking device directly engaging the threaded rod on which the pipe hanger is positioned.
Figure 13:
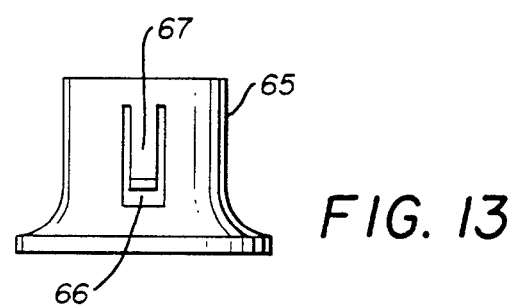
FIG. 13 is a side elevation illustrating the ferrule of FIG. 12.
Figure 15:
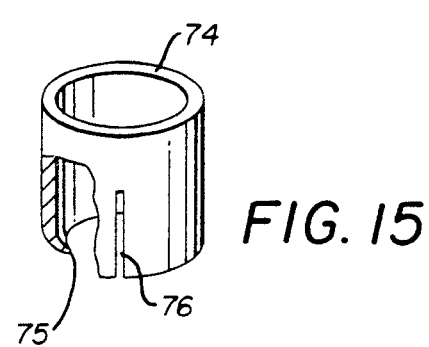
FIG. 15 is a perspective view with parts broken away and parts in cross section illustrating the locking ferrule of FIG. 14.

In FIG. 12 of the drawings, a still further variation of a locking ferrule may be seen and wherein a strap 61 has end portions 62 and 63 with at least one of these end portions having an opening 64 therein and modified ferrule 65 has a U-shaped cutaway area 66 defining an inturned pointed arm 67 which is adapted to move into the opening 64 in the end portion 63 of the strap 61 and forcefully engage the thread pattern indicated at 68 on the lower portion of the pipe hanger support rod 69.

Figure 14:
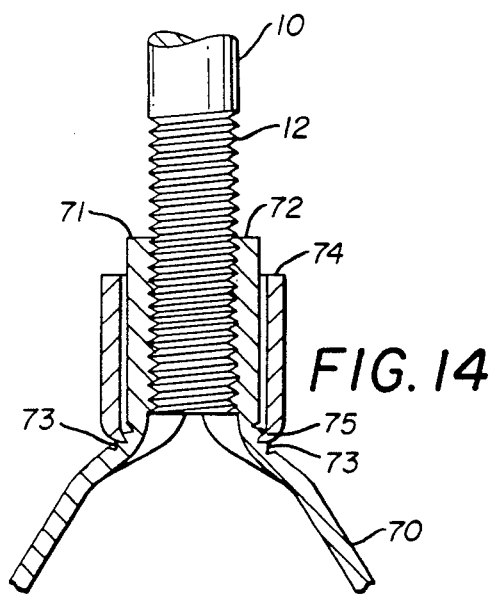
FIG. 14 is a cross sectional side elevation of still another modification of a pipe hanger strap and ferrule with locking configurations.

One further modification is illustrated herein and by referring to FIG. 14, the pipe hanger support rod 10 will be seen to have the usual threaded lower end portion 12 which is supporting a pipe holding strap 70, the end portions 71 and 72 of which have inner configurations for engagement with the thread pattern 12 and a series of grooves 73 in the area of the strap 70 where the same spreads outwardly and at the locations where the lower end of a modified ferrule 74 will engage when moved thereagainst. The modified ferrule 74 has several inturned sharpened sections 75 formed in its lower annular edge with at least one vertical slot 76 extending upwardly from the lower edge so as to add resiliency to the otherwise cylindrical ferrule 74. In operation, the end portions 71 and 72 of the strap 70 are engaged on the threaded portion 12 of the support rod 10 and the ferrule 74 is then pushed downwardly forcefully so that its lower inturned resilient sections 75 which are sharply pointed will spring outwardly sufficiently to engage one of the grooves 73 in each of the end portions of 71 and 72 of the strap 70 whereupon the ferrule becomes self-locking with respect thereto and holds the pipe hanger in desirable pipe supporting assembly.

It will also occur to those skilled in the art that several of the different ferrules hereinbefore disclosed which are necessary in holding the end portions of the strap portion of the pipe hanger in non-slipping engagement with the threaded support rod can be arranged so that the walls of the ferrules are tapered with respect to a common vertical axis and/or the outer surfaces of the end portions of the strap of the device arranged so that a frictional engagement occurs when the ferrule is forcefully positioned on the end portions as necessary in securing the same in non-slip relation to the threaded support rod.

The frictional engagement can be improved by providing a roughening treatment to the inner surfaces of the ferrule and/or the outer surfaces of the end portions of the strap and a suitable adhesive can also be employed for insuring the retention of the ferrule in desired positioning on the end portions of the strap to insure that the assembly remains assembled and in desirable pipe supporting relation at all times thereafter.

The modification illustrated in FIG. 8 can be changed so that openings are substituted for the projections 46 on the ferrule 45, which will then register with the projections 44 on the end portions 42 and 43 of the strap 41. The inturned dimples 19 on the ferrule 18 of FIG. 1 can be outturned and moved to the ends 14 and 15 of the strap 13 and the grooves 16 and 17 can be formed in the inner surface of the ferrule 18, thus reversing the configurations.

Although several embodiments of the present invention have been illustrated and described, it will be apparent to those skilled in the art that various changes and modifications may be made therein without departing from the spirit of the invention and having thus described my invention what I claim is:

1. An improvement in a pipe hanger, which pipe hanger includes a strap to be positioned about a pipe to be suspended, the ends of said strap arranged to be moved to positions adjacent one another and secured to a threaded support rod, the improvement comprising means for securing said ends of said strap to said threaded support rod, said means consisting of end portions on said strap shaped to engage the opposite sides of said threaded support rod, and a ferrule movable coaxially of said support rod over said end portions of said strap so as to move said end portions against said threaded support rod in non-slipping engagement therewith, and means for locking said ferrule in said position against said end portions, said locking means consisting of at least one inward projection on said ferrule and a half circular groove in the exterior surface of at least one of said end portions of said strap disposed horizontally and transversely thereof and at least one vertical groove in said end portion of said strap extending between said horizontally disposed groove and the end of said strap adjacent said horizontally disposed groove and arranged to receive said inward projection of said ferrule when the ferrule is moved longitudinally of said end portions of said strap and rotated relative thereto.

2. The improvement in a pipe hanger set forth in claim 1 and wherein said ferrule consists of a thin-wall tube, the normal inner diameter of which is slightly larger than the outer diameter of said threaded support rod with said end portions of said strap engaged thereon so that the ferrule can be manually moved into position thereover.

3. The improvement in a pipe hanger set forth in claim 1 and wherein said half circular grooves in the exterior surface of at least one of said end portions of said strap are formed in a spiral configuration in which said inward projection on said ferrule will register so as to impart axial movement to the ferrule when the same is rotated relative thereto.

* * * * *